United States Patent [19]
Sohn et al.

[11] Patent Number: 5,442,402
[45] Date of Patent: Aug. 15, 1995

[54] MODULAR MEMORY FOR AN IMAGE DECODING SYSTEM

[75] Inventors: Chang Sohn; Oh-Sang Kwon, both of Seoul, Rep. of Korea

[73] Assignee: Daewoo Electronics Co., Ltd., Seoul, Rep. of Korea

[21] Appl. No.: 127,256

[22] Filed: Sep. 23, 1993

[30] Foreign Application Priority Data

Sep. 23, 1992 [KR] Rep. of Korea ............... 1992-17346

[51] Int. Cl.$^6$ .............................................. H04N 7/32
[52] U.S. Cl. ....................................... 348/416; 348/716
[58] Field of Search ............................... 348/714–721, 348/402, 410, 413, 416, 699, 443; H04N 7/137; 364/231.8

[56] References Cited

U.S. PATENT DOCUMENTS

| | | | |
|---|---|---|---|
| 4,189,767 | 2/1980 | Ahuja | 364/231.8 |
| 4,766,496 | 8/1988 | Hedley et al. | 348/716 |
| 4,776,025 | 10/1988 | Hosoda | 348/714 |
| 4,998,167 | 3/1991 | Jaqua | 348/443 |
| 5,068,650 | 11/1991 | Fernandez et al. | 348/715 |
| 5,220,425 | 6/1993 | Enari et al. | 348/715 |
| 5,227,882 | 7/1993 | Kato | 348/718 |
| 5,315,388 | 5/1994 | Shen et al. | 348/714 |
| 5,373,323 | 12/1994 | Kwon | 348/718 |
| 5,376,973 | 12/1994 | Katayama et al. | 348/714 |

OTHER PUBLICATIONS

A Motion-Compensated Interframe Coding Scheme for Television Pictures, by Niromiya et al., Jan. 1982, pp. 201–211.

Fixed and Adaptive Predictors for Hybrid Predictive-/Transform Coding, by Ericsson, Dec. 1985, pp. 1291–1302.

*Primary Examiner*—Tommy P. Chin
*Assistant Examiner*—Richard Lee
*Attorney, Agent, or Firm*—William F. Pinsak

[57] ABSTRACT

A high speed modular memory adapted for use in a decoding system of motion compensated prediction coded image data, comprises: $2^N$ memory modules each comprising a two dimensional memory array with an address register for storing different pixels of a frame of the image data, wherein said N is a positive integer; a read/write signal generator for generating a read/write signal in response to a frame synchronization signal from the image data; an address generator for simultaneously generating a horizontal and a vertical addresses for each of the $2^N$ memory modules in response to a motion vector separated into a horizontal motion vector and a vertical motion vector and the read/write control signal; a data bus for communicating the image data with the $2^N$ memory modules; and an order changer which changes within the data bus positions of the data simultaneously read from the $2^N$ memory modules within the data bus in response to the horizontal motion vector.

4 Claims, 7 Drawing Sheets

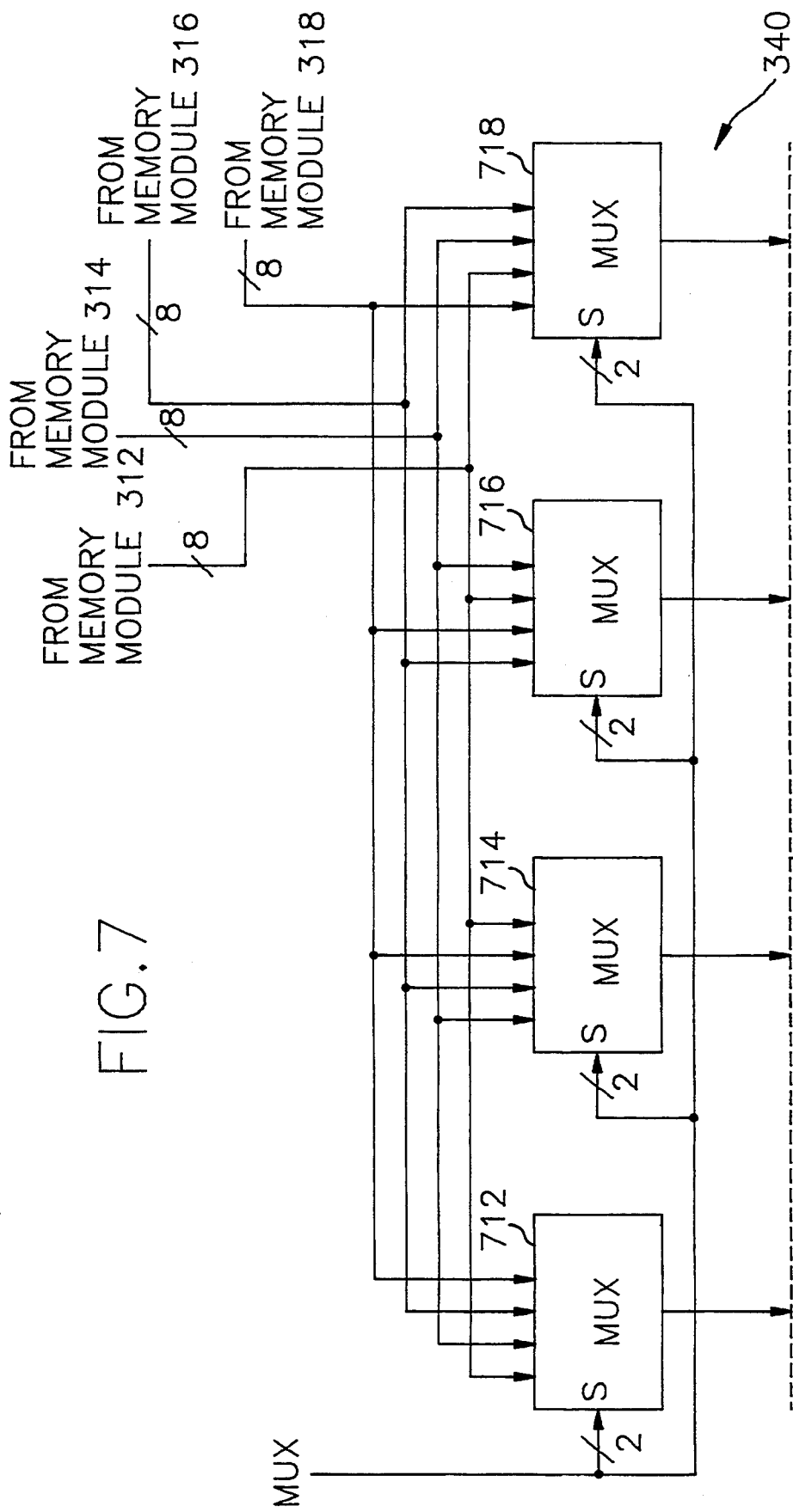

MODULAR MEMORY FOR AN IMAGE DECODING SYSTEM

FIELD OF THE INVENTION

The present invention relates to a memory system; and, more particularly, to a modular memory for use in a decoding system of motion compensated prediction coded image data.

DESCRIPTION OF THE RELATED ART

In recent years, with the dramatic growth of the information industry, a greater demand has risen for the accumulation and transmission of video information.

Practically speaking, in order to effectively achieve the accumulation and transmission of image data, certain compression technique(s) must be employed.

Among the known techniques, there exists a predictive coding which is based on the concept of utilizing the redundancies between neighboring frames when image data comprises a sequence of image "frames". In the predictive coding method, the values of pixels in a present frame to be transmitted are predicted from the values of their corresponding, previously transmitted pixels in the preceding frame stored in a frame memory; the differences between the values of the pixels in the present frame and the predicted values are compressed (or coded); and then the compressed data is transmitted.

A predictive coding method of late utilizes a so-called motion compensated prediction method. This method is described, for example, by Staffan Ericsson in "Fixed and Adaptive Predictors for Hybrid Predictive/Transform Coding", IEEE Transactions on Communications, COM-33, No. 12 (December 1985); and by Ninomiya and Ohtsuka in "A Motion-Compensated Interframe Coding Scheme for Television Pictures", IEEE Transactions on Communications, COM-30, No. 1 (January 1982). In this method, an image frame is divided into a plurality of subimages (or blocks). The size of a subimage typically ranges between $8 \times 8$ and $32 \times 32$ pixels. The motion compensated prediction is a process of determining, for each block in a present frame, the movement of the block between the present frame and its previous frame, and predicting the block from its previous frame according to the motion flow.

As is well known in the art, fast accessing of a memory is important in realizing a high speed processing system such as a signal processing system. Further, when a memory is employed as a frame memory in a decoding system of motion compensated prediction coded data (, as well as when a memory is employed as a frame memory in the corresponding encoding system), it becomes vitally important to speed up the memory, since the memory should be able to cope with, at least, such prediction per every block in a present frame being inputted at a fairly high rate. Thus, higher speed memory is preferred, especially when the amount of video information to be processed within a given time becomes large in the decoding system.

There exist several high speed memories currently in use. Among them, a modular memory, also called an interleaved memory, is able to carry out two or more simultaneous accesses to a memory partitioned in separate modules which are independent each other, thereby increasing the memory access speed. In such a modular memory, a memory module is a memory array with its own address and buffer registers. More detailed description concerning such modular memory can be found, for example, in U.S. Pat. No. 4,189,767 issued to Sudhir R. Ahuja. With such modular memory, higher memory access speed can be achieved in a cost effective manner without incurring substantial increase in the hardware and software complexities, which is a desirable feature for an image decoding system.

SUMMARY OF THE INVENTION

Therefore, it is the object of the present invention to provide a high speed modular memory for use in a decoding system of motion compensated prediction coded image data.

In accordance with the present invention, there is provided a high speed modular memory adapted for use in a decoding system of motion compensated prediction coded image data, comprising: $2^N$ memory modules each comprising a two dimensional memory array with an address register for storing different pixels of a frame of the image data, wherein said N is a positive integer; a read/write signal generator for generating a read/write signal in response to a frame synchronization signal from the image data; an address generator for simultaneously generating a horizontal and a vertical addresses for each of the $2^N$ memory modules in response to a motion vector separated into a horizontal motion vector and a vertical motion vector and the read/write signal; a data bus for communicating the image data with the $2^N$ memory modules; and an order changer which changes within the data bus positions of the data simultaneously read from the $2^N$ memory modules within the data bus, in response to the horizontal motion vector.

BRIEF DESCRIPTION OF THE DRAWINGS

The above and other objects and features of the instant invention will become apparent from the following description of the preferred embodiments taken in conjunction with the accompanying drawings in which:

FIG. 7 depicts a block diagram of the order changer of FIG. 3.

DESCRIPTION OF THE PREFERRED EMBODIMENT

Figure 1:
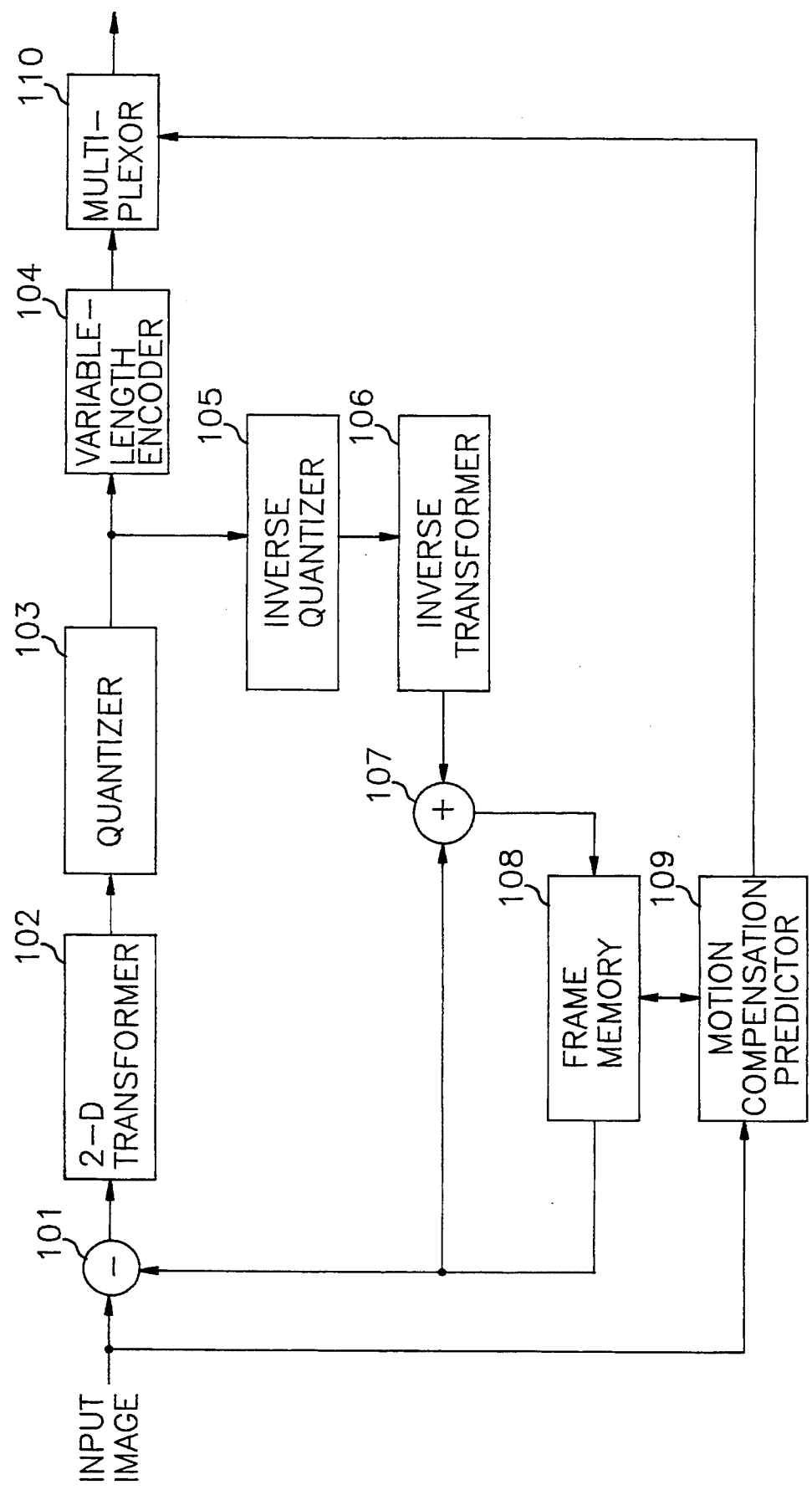
FIG. 1 is a block diagram of a prior art hybrid encoder.

With reference to FIG. 1, there is shown an exemplary image encoding system called a hybrid encoder which employs a motion compensated predictive coding as its compression method.

As shown in FIG. 1, each block of pixels from a digitized input image data is fed to a subtracter 101. In the subtracter 101, each block of pixels, each of which represents the magnitude of a picture element, is compared with the corresponding block from the previous frame. The block of resultant difference data is transformed to a block of transform coefficients using a two-dimensional discrete cosine transformation at a 2-D Transformer 102, and the coefficients in each block of transform coefficients are quantized at a quantizer 103 and are encoded at a variable length encoder 104 for their transmission through the data channel. At the transmitter, each block and thereby the entire frame is reconstructed by inversely quantizing and transforming the quantized coefficients and adding them to the corresponding pixels of the previous frame at a summer 107. A frame memory 108 stores the reconstructed pixels for the next block-by-block comparison with the corresponding pixels in the next image frame.

The coding efficiency of the hybrid encoder can be further improved by using a motion compensated prediction method. In this method, the previous frame is scanned to locate a block that most closely matches the present block within a threshold. Difference data is then formed between the present block and the matching block from the previous frame. In case there is no matching block within the threshold, no signal will be applied to the subtracter 101 from the frame memory 108 and only the transform coding will be performed. The motion compensation predictor 109 also generates a motion vector indicating the shift of the input block between the present frame and the previous frame. The motion vector, together with the variable length coded block will be forwarded through a multiplexor 110 to the receiver.

Figure 2:
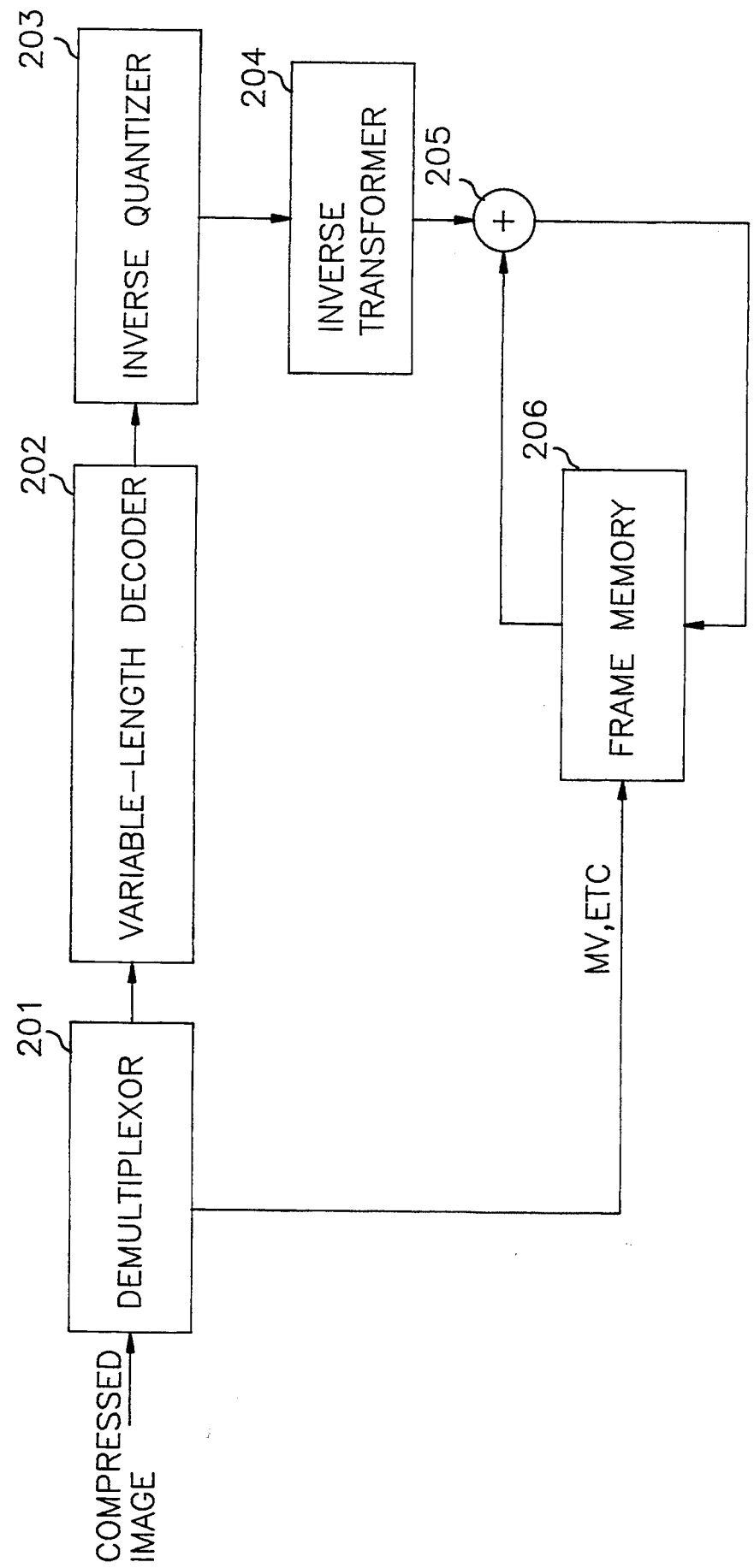
FIG. 2 is a block diagram of a prior art hybrid decoder.

In FIG. 2, there is shown an exemplary hybrid decoder matching with the hybrid encoder of FIG. 1. Demultiplexor 201 takes the compressed image signal, identifies its constituents (e.g., motion vector, frame sync signal, etc) and routes them to the relevant parts of the receiver. The variable length encoded data stream of the hybrid encoder of FIG. 1 is decoded at a variable length decoder 202, and inversely quantized and transformed by an inverse quantizer 203 and an inverse transformer 204. Each block of the resultant difference data is summed with the matching block from the previous frame to form the reconstructed block of the present frame to be stored in a frame memory 206.

As previously discussed, when a memory is used as a frame memory in a decoding system of motion compensated prediction coded image data such as the abovementioned hybrid decoder, fast accessing to the memory becomes vital, and the present invention provides the fast access ability.

Figure 3:
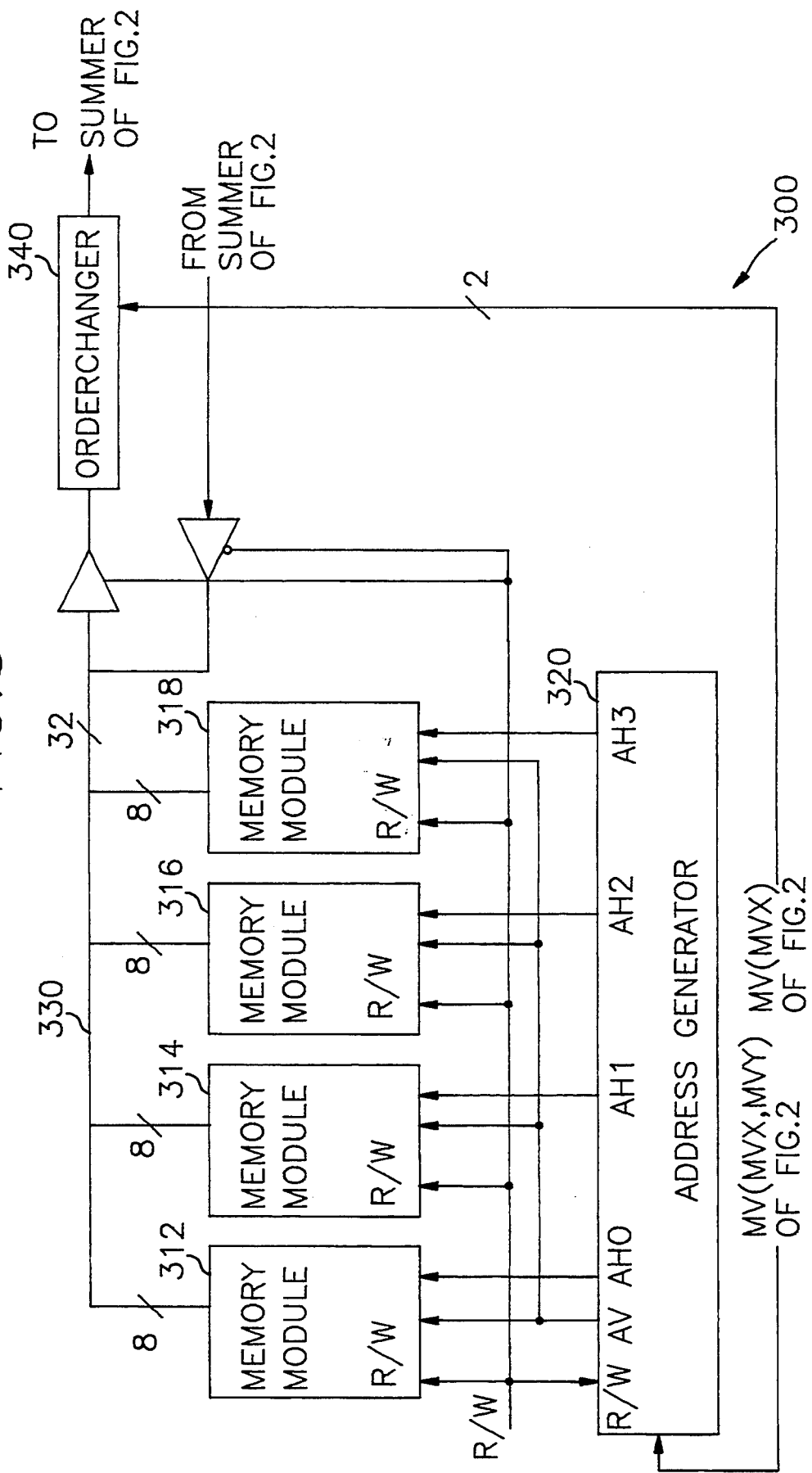
FIG. 3 shows a block diagram of a modular memory in accordance with the preferred embodiment of the present invention.

FIG. 3 shows a modular memory in accordance with the preferred embodiment of the present invention. (Although, the present invention will be described particularly in connection with an image decoding system, it will be appreciated to those skilled in the art that the modular memory of the present invention can be adapted for use in the corresponding image encoding system with appropriate additional circuitry.) In a decoding system of motion compensated prediction coded image data such as shown in FIG. 2, two such modular memory may be employed as a frame memory in a manner shown in FIG. 4, thereby overlapping reading and writing operations of the frame memory.

Figure 4:
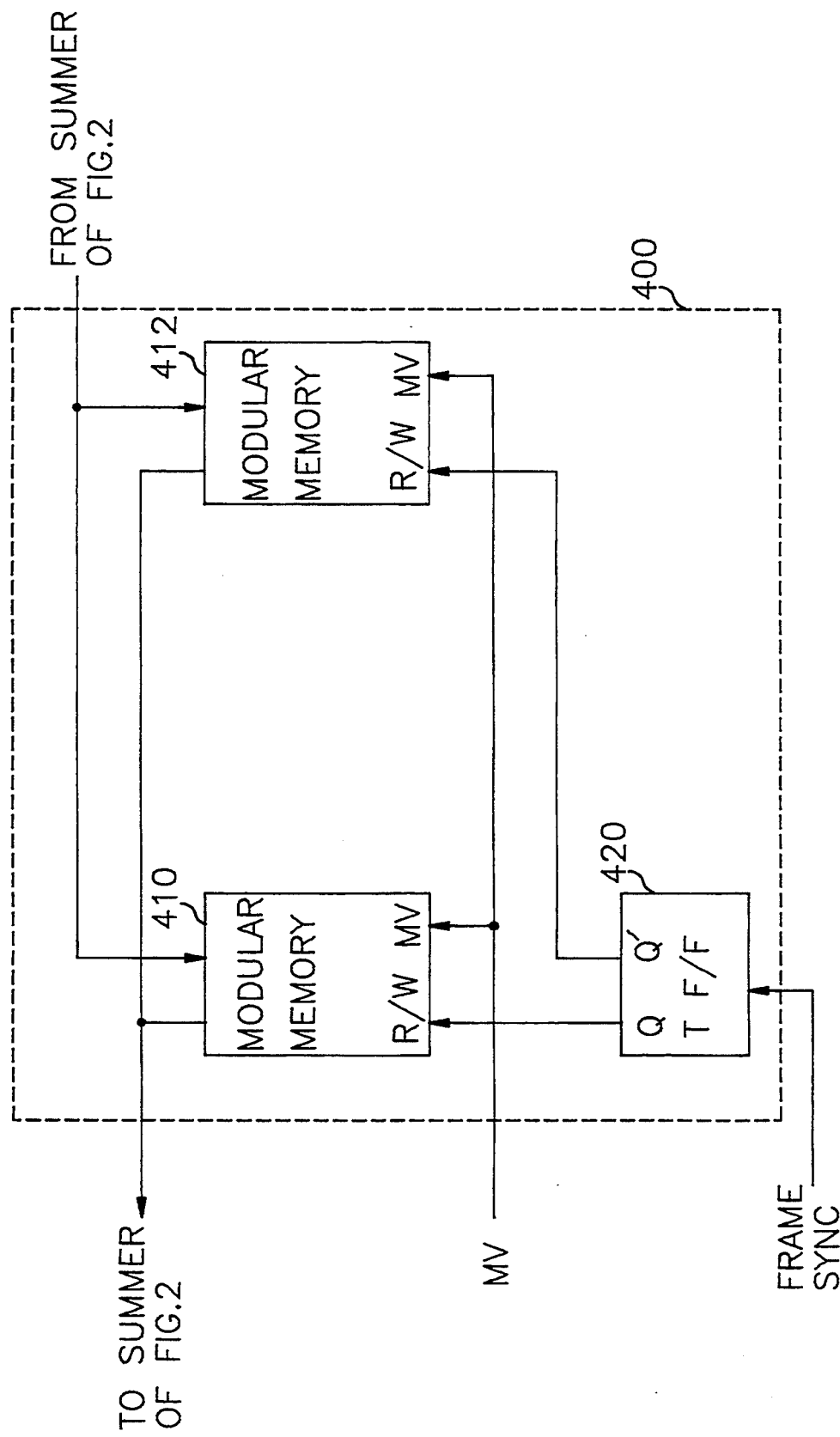
FIG. 4 represents a frame memory of a decoding system such as shown in FIG. 2, comprising the two modular memories of FIG. 3.

In FIG. 4, a frame memory comprises two modular memories 410,412 such as shown in FIG. 3; and a T(toggle) flip-flop 420 which has two outputs Q, Q', and complements its state in response to every frame sync signal from the motion compensated prediction coded image data. The outputs Q, Q' of the T flip-flop are respectively connected to the modular memories 410, 412 as the read/write signals R/Ws thereof. When the output Q of the T flip-flop 420, having arbitrary initial value, is "1", the modular memory 410 will operate in read mode, while the modular memory 412 operates in write mode. On the contrary, when the output Q of the T flip-flop is "0", the modular memory 410 will operate in write mode while the modular memory 412 operates in read mode. Thereafter, their modes of operation will be switched between read and write per every frame sync signal.

Returning to FIG. 3, the modular memory 300 comprises four 8 bit data memory modules 312, 314, 316, 318 each for storing different parts of pixels of the previous frame (or the reconstructed present frame) (Although the modular memory 300 is shown to contain four memory modules each storing a plurality of 8 bit data, it will be apparent to those skilled in the art that any number, preferably a power of 2, of memory modules can be equally employed in accordance with the present invention.); an address generator 320 which, in response to the read/write signal R/W and the motion vector separated into its two component, i.e., a horizontal motion vector MVX and a vertical motion vector MVY, generates four horizontal and vertical addresses, one for each of the four memory modules 312, 314, 316, 318, simultaneously; a 32 bit data bus 330 for communicating with the four memory modules 312, 314, 316, 318; two tri-state buffers using the read/write signal R/W as their control inputs; an order changer 340 which, in response to the horizontal motion vector MVX, changes within the data bus 330 the relative positions, i.e., order of the data read from the four memory modules 312, 314, 316, 318.

Figure 5:
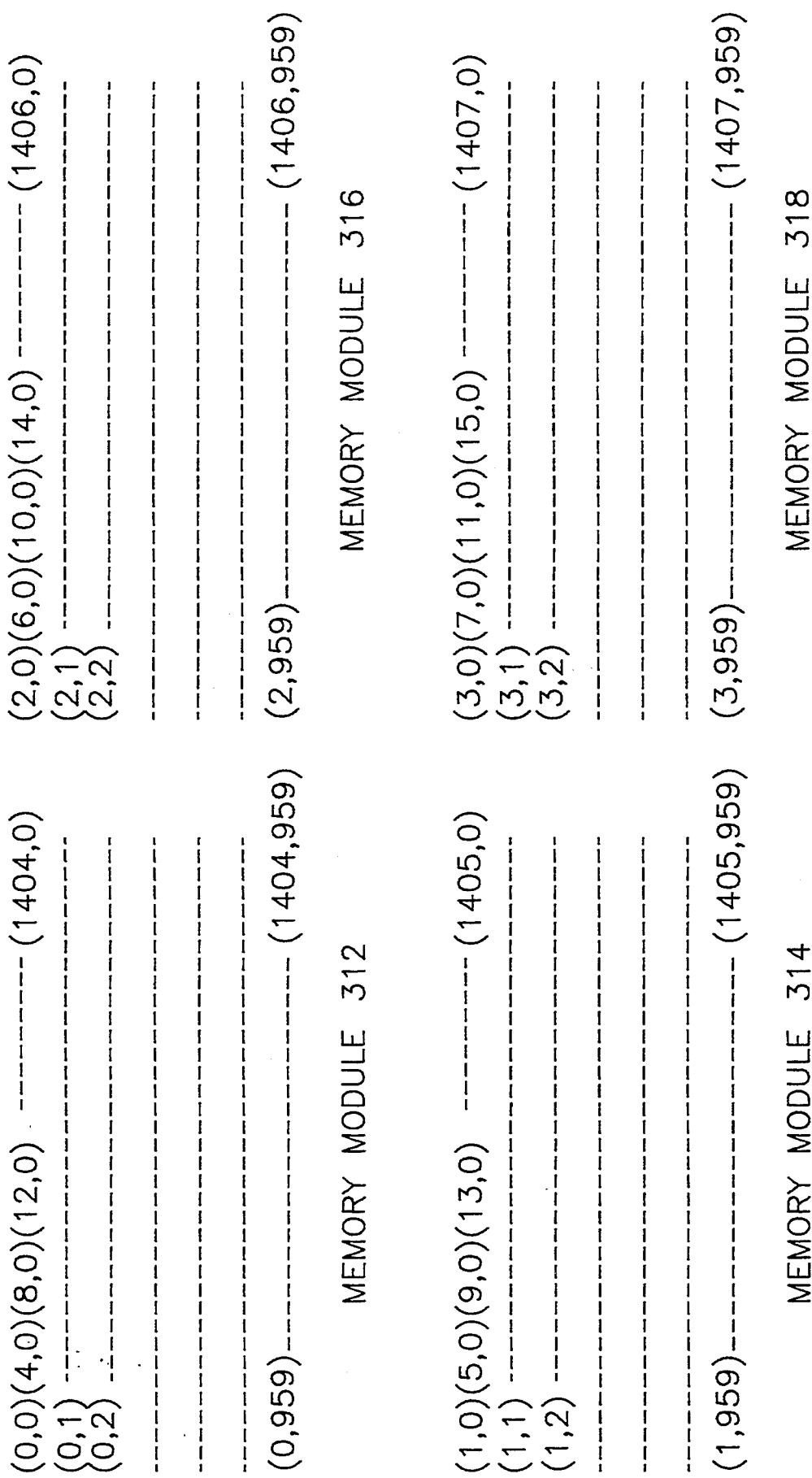
FIG. 5 presents exemplary configurations of the four memory modules of FIG. 3 for storing a frame comprising $1408 \times 960$ pixels, wherein the first number in the parentheses stands for the horizontal location of a pixel and the second number stands for the corresponding vertical location of the pixel.

Although not specifically shown in FIG. 3, each of the four memory modules 312, 314, 316, 318 comprises a two dimensional memory array together with its own address register. The address register receives a horizontal and a vertical addresses from the address generator 320 and the two dimensional memory array communicates with the bidirectional data bus 330 in a direction designated by the read/write signal R/W. Such modular memory 300 permits the four different memory modules 312, 314, 316, 318 to be accessed in parallel since each module can honor a memory request independent of the state of the other modules. With such modular memory 300, the previous frame (or the reconstructed present frame) can be stored in a distributed manner as shown in FIG. 5. (In the drawing, the first number in the parentheses stands for the horizontal location of a pixel within the frame and the second number stands for the corresponding vertical location of the pixel within the frame, forming a location pair.)

In FIG. 5, the previous frame (or the reconstructed present frame) comprising, e.g., 1408×960 pixels each containing, e.g., 8 bit data, is divided into four different groups of pixels to be stored in each of the four memory modules 312, 314, 316, 318 of FIG. 3. As shown, memory module 312 stores, among the entire pixels, those pixels each having as its horizontal location 4 (i.e., the number of memory modules in the preferred embodiment)×n, i.e., a multiple of 4, wherein n is a positive integer. Similarly, memory module 314 stores, among the entire pixels, those pixels each having as its horizontal location 4×n+1, and memory module 316 stores those pixels each having as its horizontal location 4×n+2, and, finally, memory module 318 stores those pixels each having as its horizontal location 4×n+3.

As such, four horizontally consecutive pixels within the frame can be communicated in parallel with the data bus 330 of FIG. 3 in a direction designated by the read/write signal R/W when addressed simultaneously by the address generator 320. For example, when addressed with a horizontal address ("0") and a vertical address ("0") common to the four memory modules 312, 314, 316, 318, the pixels having location pairs (0,0), (1,0), (2,0), (3,0) within the frame will be accessed in parallel.

Figure 6:
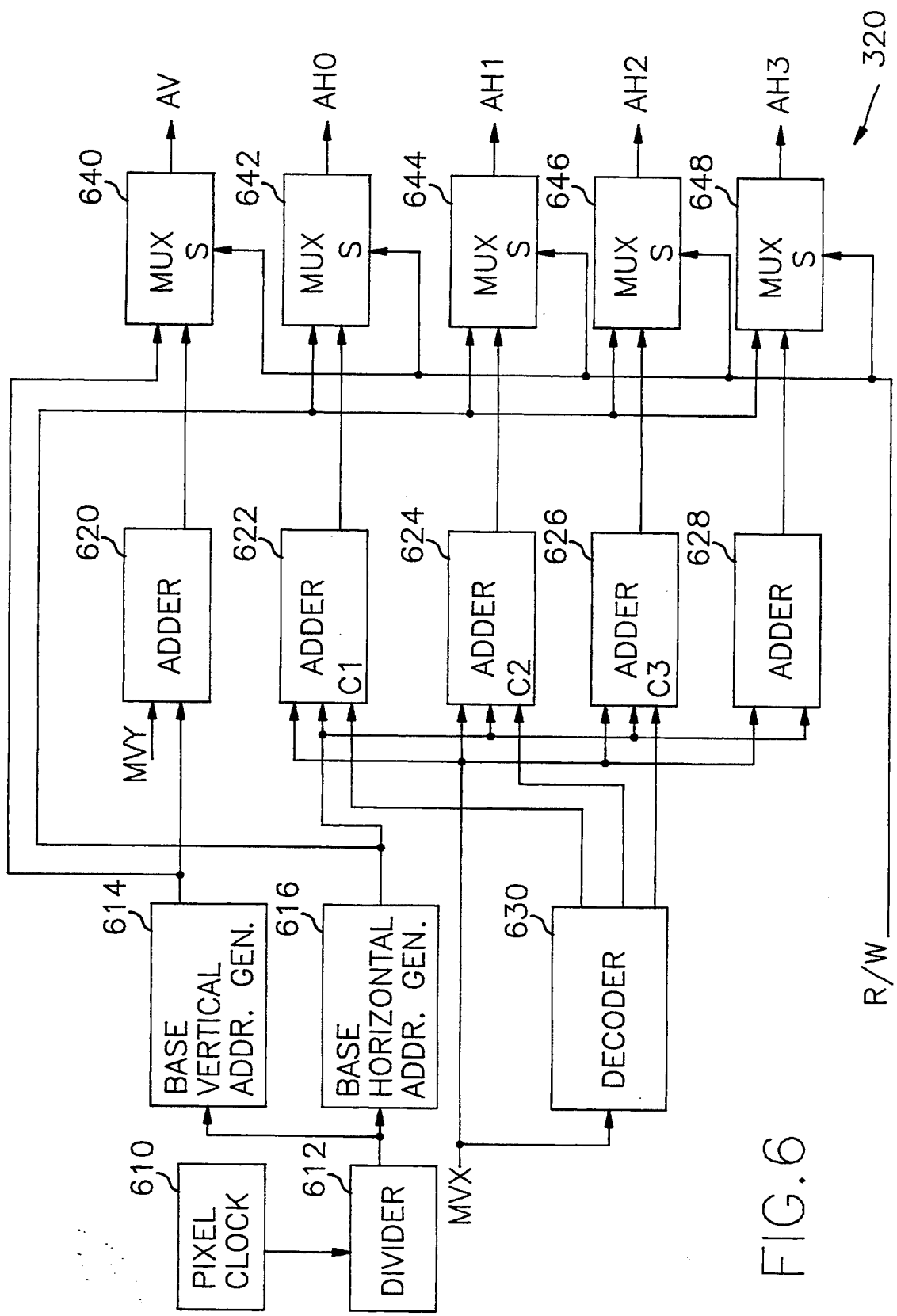
FIG. 6 illustrates a block diagram of the address generator of FIG. 3.

Turning now to FIG. 6, there is shown a more detailed description of the address generator 320 of FIG. 3. As shown, the address generator 320 comprises a pixel clock 610 generating pixel clock pulses; a clock divider 612 which divides the pixel clock pulses by 4, i.e., the number of memory modules in the preferred embodiment; a base horizontal and a base vertical address generators 614, 616 which respectively generates, by counting the signals from the divider 612, a base horizontal and a base vertical addresses, i.e., a horizontal and a vertical locations of a first pixel within the present frame among four horizontally consecutive pixels of the present frame to be reconstructed; an adder 620 which adds the vertical motion vector MVY to the base vertical address to form a read vertical address; four adders 622, 624, 626, 628 which respectively adds the horizontal motion vector MVX truncated its lower $2(=\log_2 4$, *i.e., the number of memory modules*$)$ bits to the base horizontal address to form four read horizontal addresses, one for each of the four memory modules 312, 314, 316, 318 shown in FIG. 3; a decoder 630 which, in response to the lower $2(=\log_2 4$, *i.e., the number of memory modules*$)$ bits of the horizontal motion vector MVX, generates three carries, one for each of the adders 622, 624, 626 to correct the read horizontal addresses further in a way described hereinafter; a multiplexor 640 which, in response to the read/write signal R/W, selects a vertical address common to the four memory modules 312, 314, 316, 318 between the base vertical address and the read vertical address; and four multiplexors 642, 644, 646, 648 each of which, in response to the read/write signal R/W, selects a horizontal address for the corresponding memory module between the base horizontal address and the corresponding read horizontal address.

As is stated above, to access four horizontally consecutive pixels in parallel, the address generator 320 of FIG. 6 must generates four horizontal and vertical addresses, one for each of the four memory modules 312, 314, 316, 318 shown in FIG. 3, simultaneously. However, the generated addresses should be different depending on the mode of operation involved.

Specifically, when the modular memory 300 of FIG. 3, and therefore the address generator 320, are in write mode, i.e., writing four horizontally consecutive reconstructed pixels of the present frame into the four memory modules 312, 314, 316, 318, as indicated by the read/write signal R/W("0") (refer FIGS. 2 and 4), the base vertical and the base horizontal addresses thereof will be selected by the multiplexors 640, 642, 644, 646, 648 as indicated by the read/write signal R/W("0") as the vertical and the horizontal addresses common to the four memory modules 312, 314, 316, 318, since the horizontal locations of the pixels within the present frame should be maintained as original through the reconstruction and the write.

However, when the modular memory 300, and therefore the address generator 320, are in read mode, i.e., reading four pixels of the previous frame from the four memory modules 312, 314, 316, 318, as indicated by the read/write signal R/W("1") (also refer FIGS. 2 and 4), different processing should be taken by the address generator 320, as will be described hereinbelow.

First, in contrast with the vertical motion vector MVY which can be added directly to the base vertical address at the adder 620 to form a read vertical address common to the four memory modules 312, 314, 316, 318, the horizontal motion vector MVX cannot be added directly to the base horizontal address at each of the adders 622, 624, 626, 628. Instead, for the specific storage configuration shown in FIG. 3, the horizontal motion vector MVX truncated its lower $2(=\log_2 4)$ bits will be applied to each of the adders 622, 624, 626, 628.

Taking a specific example from FIG. 5, when the pixels of the present frame to be reconstructed have a sequence of location pairs (0,0), (1,0), (2,0), (3,0) within the present frame, and the horizontal and the vertical motion vectors are 2 and 1 respectively, the pixels having location pairs (2,1), (3,1), (4,1), (5,1) within the previous frame must be read from the four memory modules 312, 314, 316, 318 in that order. Upon recalling that the previous frame can be stored in the four memory modules 312, 314, 316, 318 in a way partly depicted below:

| memory module 312 |
| --- |
| (0,0) (4,0) (8,0) ... |
| (0,1) (4,1) (8,1) ... |
| memory module 314 |
| (1,1) (5,1) (9,7) ... |
| (1,0) (5,0) (9,0) ... |
| memory module 316 |
| (2,0) (6,0) (10,0) |
| (2,1) (6,1) (10,1) ... |
| memory module 318 |
| (3,0) (7,0) (11,0) ... |
| (3,1) (7,1) (11,1) ... | it can be readily seen that, unlike the vertical motion vector MVY("1") which can be directly added to the base vertical address("0") generated by the base vertical address generator 614 to form a read vertical address("1") common to the four memory modules 312, 314, 316, 318, the horizontal motion vector MVX("2") can not be added in its original form to the base horizontal address("0") generated by the base horizontal address generator 616 to form a read horizontal address ("2") common to the four memory modules 312, 314, 316, 318 (if the horizontal motion vector MVX("2") is directly applied to the base horizontal address to form a read horizontal address("2") common to the four memory modules 312, 314, 316, 318, the pixels having location pairs (8,1), (9,1), (10,1), (11,1) within the previous frame will be read with the resultant address pairs [2,1], [2,1], [2,1], [2,1], wherein the first number in the brackets represents the read horizontal address and the second number in the brackets represents the read vertical address). Instead, the horizontal motion vector("2") truncated its lower $2(=\log_2 4)$ bits("0") is to be added to the base horizontal address ("0") at each of the adders 622, 624, 626, 628 to form a read horizontal address("0") common to the four memory modules 312, 314, 316, 318. (By now, pixels having location pairs (0,1), (1,1), (2,1), (3,1) within the previous frame can be read from the four memory modules 312, 314, 316, 318 with the address pairs [0,1], [0,1], [0,1], [0,1].)

Further, when the horizontal motion vector MVX has a value other than a multiple of 4, the read horizontal address at each of the adders 622, 624, 626 has to be further corrected with a carry generated by the decoder 630. In the above example, without any further correction, the pixels having location pairs (0,1), (1,1), (2,1), (3,1) within the previous frame will be read from the four memory modules 312, 314, 316, 318 with the address pairs[0,1], [0,1], [0,1], [0,1] instead of the (disregarding their relative order) desired pixels having location pairs (4,1), (5,1), (2,1), (3,1) within the previous frame which can be read from the four memory modules 312, 314, 316, 318 with address pairs [1,1], [1,1], [0,1], [0,1]. Therefore, to correctly address the desired pixels' location pairs, the read horizontal addresses for memory module 312 and 314 must be corrected with the carries generated from the decoder 630 to be incremented by 1 to generate the address pairs [1,1], [1,1], [0,1], [0,1] for the four memory modules 312, 314, 316, 318 respectively.

Specifically, when the horizontal motion vector MVX having a value ranging from $-16$(in two's complement form) to 15, the decoder 630 takes as its input lower $2(=\log_2 4)$ bits of the horizontal motion vector MVX and generates the carries for the adders 622, 624, 626 pursuant to the logic given in Table 1 in truth table form, which gives the (disregarding their relative order) desired results.

TABLE 1

| MVX5 (=sign bit) | MVX4 | MVX3 | MVX1 | MVX0 | C1 | C2 | C3 |
|---|---|---|---|---|---|---|---|
| X | X | X | 0 | 0 | 0 | 0 | 0 |
| X | X | X | 0 | 1 | 1 | 0 | 0 |
| X | X | X | 1 | 0 | 1 | 1 | 0 |
| X | X | X | 1 | 1 | 1 | 1 | 1 |

As a simple illustration, the overall operation of the address generator 320 will be given with reference to FIG. 6. As shown in FIG. 6, when the pixel clock pulses are applied to the clock divider 612, it divides the pixel clock pulses by 4, i.e., the number of memory modules contained in the modular memory 300 of FIG. 3, and the divided clock signal is applied to each of the base horizontal address generator 614 and the base vertical address generator 616 to generate a base horizontal and a base vertical addresses, i.e., a horizontal and a vertical locations of a first pixel within the present frame among four horizontally consecutive pixels of the present frame to be reconstructed. When the modular memory 300 of FIG. 3, and therefore the address generator 320, operate in write mode(the read/write signal R/W is "0"), the base horizontal and the base vertical addresses will be directly applied to the four memory modules 312, 314, 316, 318 shown in FIG. 3 as selected by the multiplexors 640, 642, 644, 646, 648. However, when the modular memory 300, and therefore the address generator 320, operate in read mode(the read/write signal is "1"), different processing is required. The base vertical address is summed with the vertical motion vector MVY at the adder 620 to form a read vertical address common to the four memory modules 312, 314, 316, 318. On the other hand, the horizontal motion vector MVX truncated its lower $2(=\log_2 4)$ bits are added to the base horizontal address at each of the adders 622, 624, 626, 628 to form a read address common to the four memory modules 312, 314, 316, 318.

Further, the read addresses at each of the adders 622, 624, 626 are to be further corrected by carries generated by the decoder 630 when the horizontal motion vector MVX has a value other than a multiple of 4. Subsequently, the read vertical address and the resultant read horizontal addresses will be applied to the four memory modules 312, 314, 316, 318 as selected by the multiplexors 640, 642, 644, 646, 648. Consequently, in the above specific example, the (disregarding their relative order) desired four pixel having location pairs (4,1), (5,1), (2,1), (3,1) within the present frame can be read out into the data bus 330 of FIG. 3 with the address pairs[1,1], [1,1], [0,1], [0,1].

One last problem remains unsolved, which will be described hereinbelow. Specifically, when pixels are read from the memory modules 312, 314, 316, 318 shown in FIG. 3 with a horizontal motion vector which is not a multiple of 4, their order within the data bus 330 often needs to be changed according to the horizontal motion vector MVX involved. For example, in the above example, it is already noted that the (disregarding their relative order) desired pixels having location pairs (4,1), (5,1), (2,1), (3,1) can be read from the four memory modules 312, 314, 316, 318 into the data bus 330 in a manner already described. However, the order of the pixels within the data bus 330 is not the desired one, i.e., not the order of location pairs (2,1), (3,1), (4,1), (5,1). Therefore, when the modular memory 300 is in read mode, the order changer 340 is required to change the order of the pixels within the data bus 330 in response to the horizontal motion vector MVX.

In FIG. 7, the order changer 340 of the present invention comprises four 4×1 multiplexors 712, 714, 716, 718 employing lower $2(=\log_2 4$, *i.e., the number of memory modules*) bits of the horizontal motion vector MVX as a selection input common to the four multiplexors 712, 714, 716, 718. As shown in FIG. 7, when the lower 2 bits of the horizontal motion vector MVX are "00", the first (from the left of the drawing) 8 bit data line is selected and applied to the output in the four multiplexors 712, 714, 716, 718. Similarly, when the lower 2 bits of the horizontal motion vector MVX are "01", the last data line is selected as the output; when the lower 2 bits of the horizontal motion vector MVX are "10", the third data line is selected as the output; and, finally, when the lower 2 bits of the horizontal motion vector MVX are "11", the remaining second data line is selected as the output. When this is applied to the above example, it can be easily grasped that the original order of location pairs (4,1), (5,1), (2,1), (3,1) can be converted to the desired order of location pairs (2,1), (3,1), (4,1), (5,1) within the data bus 330.

As demonstrated above, in accordance with the present invention, a high speed modular memory can be provided to a decoding system of motion compensated predictive coded image data. As a result, the processing speed of the image decoding system may be increased as far as the increased memory speed permits.

While the present invention has been shown and described with reference to the particular embodiments, it will be apparent to those skilled in the art that many changes and modifications may be made without departing from the spirit and scope of the invention as defined in the appended claims.

What is claimed is:

1. A modular memory for use in a decoding system of motion compensated prediction coded image data, comprising:

- $2^N$ memory modules each comprising a two dimensional memory array for storing different pixels of a frame of the image data in accordance with horizontal locations of the different pixels within the frame, wherein N is a positive integer;
- means for generating a read/write signal in response to a frame synchronization signal from the image data;
- an address generator for simultaneously generating a read/write horizontal and a read/write vertical addresses for each of the $2^N$ memory modules in response to a motion vector from the image data and the read/write signal;
- a parallel data bus for simultaneously outputting/inputting $2^N$ pixels of the image data from/into the $2^N$ memory modules in response to the read/write signal; and
- means for, before outputting the $2^N$ pixels, changing relative positions of the $2^N$ pixels with each other in the parallel data bus in response to a horizontal component of the motion vector so that the $2^N$ pixels are arranged in the parallel data bus in ascending order of horizontal locations of the $2^N$ pixels within the frame.

2. The modular memory of claim 1, wherein each of the $2^N$ memory modules stores the different pixels each having a same value A as determined by A=(a horizontal location of a pixel within the frame) modulo $2^N$.

3. The modular memory of claim 2, wherein said means for changing relative positions of the $2^N$ pixels includes $2^N$ multiplexors with the least significant N bits of the horizontal component of the motion vector as a selection input thereof.

4. The modular memory of claim 2 or 3, wherein said address generator includes:

- a pixel clock;
- means for generating a base vertical address in response to the pixel clock;
- means for generating a base horizontal address in response to the pixel clock;
- means for generating a modified vertical address for each of the $2^N$ memory modules by adding a vertical component of the motion vector to the base vertical address;
- means for generating a carry signal for each of $2^N-1$ memory modules of the $2^N$ memory modules in response to the least significant N bits of the horizontal component of the motion vector;
- means for generating a modified horizontal address for each of the $2^N$ memory modules by adding the horizontal component of the motion vector truncated its least significant N bits to the base horizontal address with a respective one of the carry signals.
- means for providing the modified vertical address/the base vertical address as the read/write vertical address for each of the $2^N$ memory modules in response to the read/write signal; and
- means for providing address the modified horizontal address/the base horizontal address as the read/write horizontal address for each of the $2^N$ memory modules in response to the read/write signal.

* * * * *